United States Patent [19]

Dent

[11] Patent Number: 4,689,883
[45] Date of Patent: Sep. 1, 1987

[54] PIPE CUTTING DEVICE

[76] Inventor: Larry G. Dent, 3312 Westside Hwy., Castle Rock, Wash. 98611

[21] Appl. No.: 794,856

[22] Filed: Nov. 4, 1985

[51] Int. Cl.$^4$ .................................................. B23D 21/06
[52] U.S. Cl. ........................................ 30/94; 30/276;
30/347; 30/390; 144/1 E; 144/136 C; 144/136 H; 144/218; 407/43
[58] Field of Search ...................... 30/92, 94, 115, 390, 30/388, 287, 347, 102, 93, 264, 265, 391, 276, 475, 505; 125/3, 5, 9, 15, 12 R; 144/1 E, 1 F, 134 D, 136 C, 136 G, 136 H, 180, 218; 407/43

[56] References Cited

U.S. PATENT DOCUMENTS

| | | | |
|---|---|---|---|
| 2,069,922 | 2/1937 | Olson | 125/3 X |
| 4,009,742 | 3/1977 | Ziegelmeyer | 144/218 X |
| 4,188,935 | 2/1980 | Tubesing | 30/122 X |
| 4,243,011 | 1/1981 | Bodycomb et al. | 125/13 R |

FOREIGN PATENT DOCUMENTS 667559 11/1938 Fed. Rep. of Germany ........ 30/388

Primary Examiner—Douglas D. Watts

[57] ABSTRACT

An apparatus for simultaneously cutting and beveling plastic pipe such as water or sewer pipe is described. This apparatus includes a rotatable cutting head on which inclined and protruding cutting edges are provided to cut and bevel the pipe. The cutting head is mounted in a housing the lower surfaces of which include two convex pipe engaging regions positioned on either side of the cutting head which are contoured to contact the pipe and maintain the cutting head in proper cutting and beveling relation to the pipe when the housing is moved laterally or angularly relative to the pipe. Concave pipe engaging regions flank the convex regions to maintain the housing in contact with the pipe. The cutting bits are tapered to aid in retaining them in position in the cutting head.

14 Claims, 4 Drawing Figures

PIPE CUTTING DEVICE

FIELD OF THE INVENTION

The present invention relates to an apparatus for simultaneously cutting a length of pipe into two pieces and beveling the ends of the cut pieces. More particularly the invention relates to a portable hand held power tool for cutting plastic pipe such as sewer or water pipe in the field and simultaneously beveling the ends of the pipe as it is cut.

BACKGROUND OF THE INVENTION

Plastic pipe and plastic fittings are used in many sewer and water pipe installations, both for the main water and sewer lines as well as for connecting individual residences or commercial buildings to the main lines. Such plastic pipe and plastic pipe fittings have, in the past, been bonded together to form a single, rigid pipe network. Such a network, however, is incapable of flexing sufficiently to reliably accomodate the stresses arising from burying the pipe in its trench or from shifting of the earth. Repairs to such networks are also difficult since the pipe must be cut apart to remove a defective section or install a fitting. Accordingly, many water and sewer pipe installations which are made with plastic pipe are joined using an annular elastomeric seal. This seal is normally mounted in the enlarged end of the pipe or fitting. The beveled end of a pipe is then forced into the seal in the enlarged end of the pipe or fitting. The fit is sufficiently tight to seal the two pipes or the pipe and fitting to one another without the use of glues, caulking compounds or fastening devices.

Typically, plastic pipe is made by the manufacturers in standard lengths with one end being beveled to facilitate the insertion of the pipe into the seal. The other end of the pipe is enlarged to the proper diameter to receive a seal and the beveled end of a pipe.

When pipes of other than standard length are required, a pipe of standard length has heretofor generally been cut off in the field using an abrasive disc cutting device. Such a device is similar in configuration to a chain saw with the exception that a support arm is mounted in place of the saw bar. A shaft is rotatably mounted at the end of the support bar and extends transversely through the arm. The shaft is rotatably driven by a belt and pulley drive mechanism and an abrasive disc is mounted on the end of the shaft opposite the pulley. The abrasive disk is rotated at a high rate of speed by the motor of the cutting device.

The cutting of the pipe is accomplished by bringing the rotating abrasive disc into contact with the pipe as it lies on the ground. Typically, the operator rolls the pipe along the ground as necessary with his foot until the cut is completed. Since no guide is provided for cutting of the pipe, the cut end of the pipe frequently is irregular and may not be perpendicular to the longitudinal axis of the pipe.

Once the pipe has been cut according to this method it is necessary to put a bevel on the cut end in order to facilitate insertion of the pipe into a seal mounted in the enlarged end of a pipe or fitting. This is generally accomplished by bringing the side of the rotating abrasive disc against the pipe at the appropriate angle and grinding the bevel onto the pipe. The pipe is again rotated as necessary so that it can be beveled about its entire circumference. It is difficult to control the cutting device in such circumstances, however, and the bevel is thus frequently very irregular. In addition, this grinding procedure frequently results in the bevel extending between the inner and outer surfaces of the pipe wall. In such case, the angle of incline of the bevel is quite steep making it difficult to force the seal onto the pipe end.

This task of cutting and beveling the pipe is not only difficult and time consuming but also produces a great deal of dust which is harmful both to the engine of the cut off device and to the person operating such device. In addition, a certain danger is involved in operating such a cut off device since the rapidly rotating disc may break and eject fragments of the abrasive material at relatively high speeds. The abrasive disc may also be brought into contact with rocks or other debris during the cutting and beveling operation resulting in such debris being thrown at relatively high speeds.

This method of cutting pipe also results in waste since small sections of the pipe formed when a pipe is cut to length are frequently discarded because of the difficulty of beveling them.

SUMMARY OF THE INVENTION

The present invention provides a cut off device which simultaneously cuts a pipe to the proper length and bevels the ends of both pieces formed by the cutting process. The cuts produced by this device are of uniform depth and bevel angle and the lip of the cut pipe is rounded to facilitate mounting of the seal on the pipe. This rounding of the lip results in a blunt pipe end with sufficient thickness and rigidity so that it does not fold or bunch up when the seal is installed or when the end of the pipe and the seal are forced into the enlarged opening of a fitting or of another pipe. Any such folding or bunching of the pipe is, of course, undesirable since it may result in plugging or leaking of the pipe and hampers the flow of materials therethrough. In addition, since both pieces of pipe are simultaneously beveled, wastage resulting from the discarding of small sections of pipe is avoided.

This pipe cutting device employs a rotary cutting head which includes a plurality of cutters which produce shavings of the pipe material rather than harmful dust during the cutting process. An adjustable cutting guard is provided which also serves as both a guide and a depth guage so that the device may be used for cutting and beveling pipes of different wall thicknesses. The guard includes a convex pipe-engaging section which is contoured to maintain the proper distance between the pipe and the center of the rotary cutter so long as it is engaged with the pipe at some point along this convex surface. This permits the operator of the cutting device to position the saw at a wide variety of angles relative to the pipe and accomodates a wide lateral range of contact positions between the guide and the pipe without sacrificing uniformity in the depth of cut or width of beveled section.

The guard also includes two concave sections disposed on either side of the convex pipe-contacting section. Should the cutting head and guide be moved to the extreme of the convex section, these concave sections receive the pipe and prevent the guide from slipping out of contact with the pipe. This prevents the cutting device from slipping out of contact with the pipe and into contact with the operator or the ground. Contact between the ground and the rotating cutting head may, of course, result in small rocks or other debris being thrown by the cutting head. In addition, were the guide to slip from its cutting position, an irregular cut could be made in the pipe possibly rendering the pipe unusable.

The pipe cutting device also includes other safety features. For example, the cutting bits are positioned in slots in the rotary cutting head by means of set screws. The bits are formed so that, in the event a set screw should become loose and begin to back out, the cutter will not immediately come loose from the cutting head. Rather, it will begin to slowly move out of the slot in proportion to the amount the set screw has backed out. This condition will be immediately be noticeable by the operator of the apparatus who can then take steps to correct the situation before the cutter is flung from the cutting head. In addition, because of this construction, a locking plate may be positioned between the set screw and cutter. The set screw deforms the soft material of the locking plate making the unintentional loosening of the set screws unlikely.

Although the combined guard and depth guage produces a cut and bevel of uniform depth, it is also desirable that the pipe be cut perpendiular to its axis. According to the present invention this can be accomplished by use of a collar which is positioned adjacent the cutting zone and which is engaged by the guard.

The cutting head may also be constructed to allow quick detachment from the drive shaft of the cutting device so that, for example, an abrasive disk may be installed, or the cutting head replaced. An index scale or worm drive may be used to aid in positioning in the cutting guard and guide relative to the cutting head to accomodate pipes having a different wall thicknesses.

DETAILED DESCRIPTION OF THE PREFERRED EMBODIMENT

Figure 1:
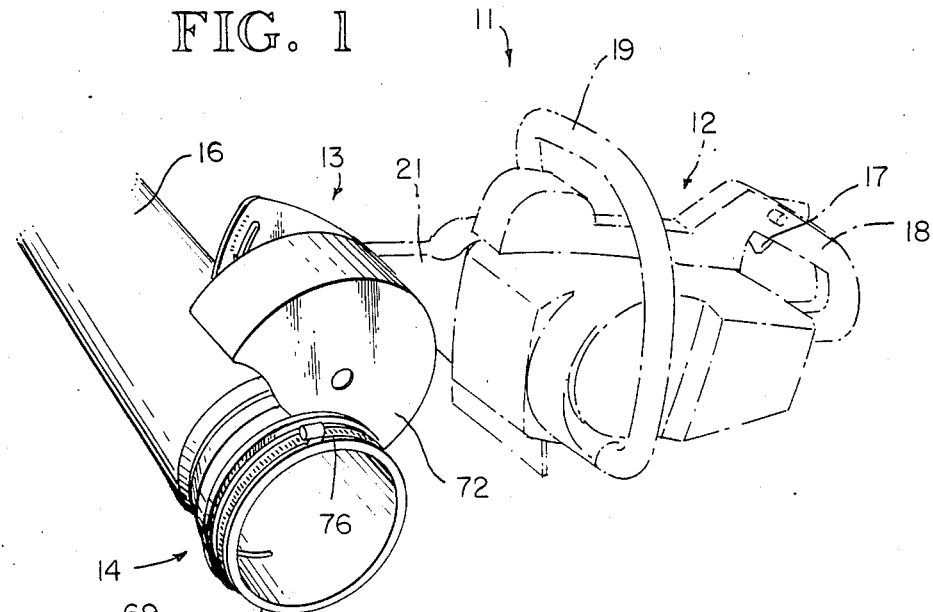
FIG. 1 is a perspective view of a cutting device according to the present invention.

Referring to FIG. 1, the pipe cutting device 11 of the present invention includes a motor drive assembly 12, a guard and cutting assembly 13 and a guide assembly 14 shown in position on a pipe 16.

The motor drive assembly 12 is similar to the motor drive assembly of a conventional chain saw and may be powered by a conventional gasoline engine or electric motor. The speed of the motor is controlled by means of a trigger 17 which is mounted on a control handle 18 at the rear of the motor drive assembly 12. A second handle 19 is provided near the center of mass of the pipe cutting device 11 for lifting and positioning the device 11.

The motor drive assembly differs from a conventional chain saw in that the saw bar is replaced with a support arm 21. This support arm extends between the motor drive assembly 12 and the guard and cutting assembly 13. A shaft 22 is rotatably supported by the arm 21 by means of a thrust bearing 23 and extends transversely through the arm. A pulley 24 is mounted on the shaft 22 and connected by means of a conventional slot and key arrangement (not shown). The pulley 24 is maintained in position on the shaft 22 by means of a nut 26 which is threaded onto one end 27 of the shaft 22.

The inner surface of the pulley is positioned to bear against the thrust bearing 23 and thus prevents the threaded end 27 of the shaft 22 from moving toward the bearing 23. The other end 28 of the shaft is enlarged in diameter and bears against the other side of the thrust bearing 23. As such, the shaft is maintained in position relative to the arm 21 and is supported for rotation relative thereto. The shaft is rotatably driven by the motor drive assembly by means of a drive belt 29 which extends around the pulley 24 and around a drive pulley (not shown) mounted on the drive shaft of the motor 12. Driving forces received by the pulley 24 are, in turn, transmitted to the shaft 22 by means of a conventional slot and key arrangement. The belt and pulley system are enclosed and protected by a beltguard 30.

The enlarged end 28 of the shaft 22 is provided with a recess 31 of square cross section which receives the square end 32 of an arbor 33. The central portion of this arbor 33 is generally cylindrical and a flange 34 is provided at one end thereof. The square end 32 of the arbor 33 is maintained in position in the recess 31 in the enlarged end 28 of the shaft 22 by means of a bolt 36 which extends longitudinally through the arbor 33 and threads into an axial threaded bore 37 in the shaft 22. The diameter of the cylindrical central section of the arbor 33 is less than that of the enlarged end 28 of the shaft 22.

Figure 2:
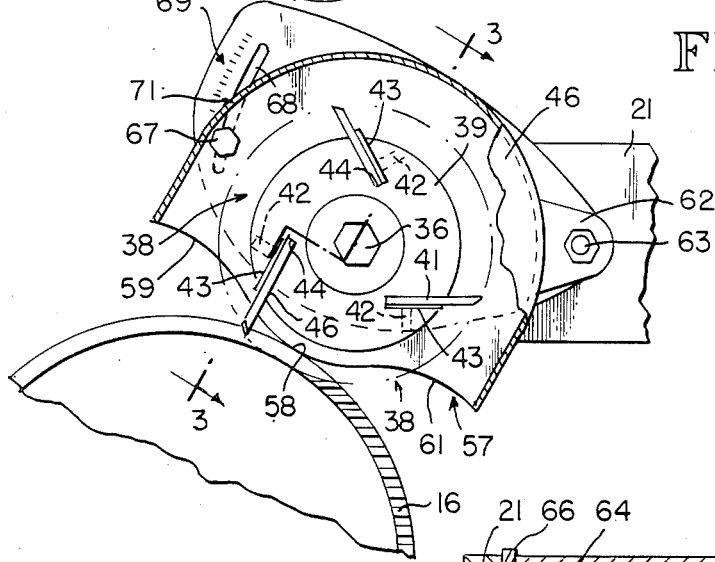
FIG. 2 is a side elevation of the cutting head and guide of the pipe cutter of FIG. 1 with parts broken away.
Figure 3:
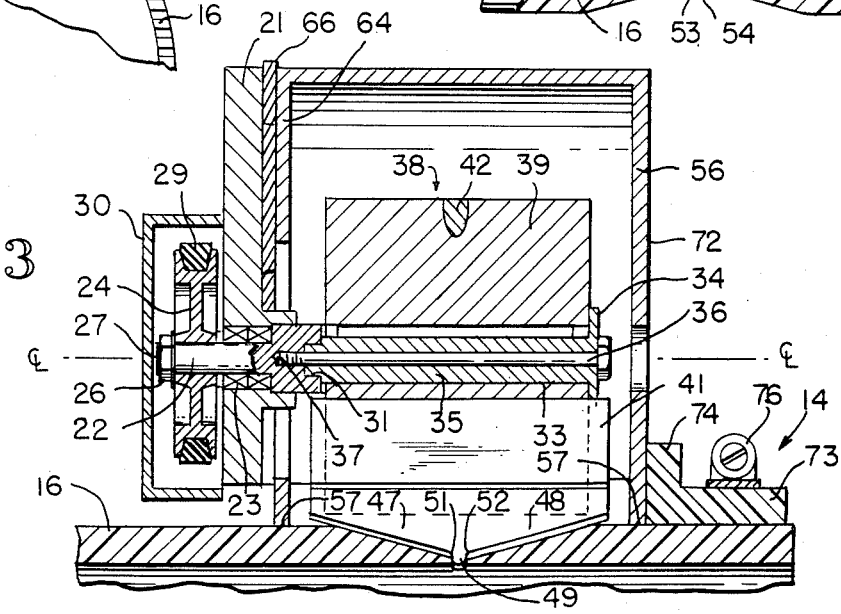
FIG. 3 is a sectional view of the pipe cutter with parts removed taken along the line 3—3 of FIG. 2.

Referring next to FIGS. 2 and 3, the cutter head 38 is mounted on the arbor 33. This cutter head 38 comprises a cylindrical cutter mounting block 39 which is slotted to receive a plurality of tapered cutting bits 41. These cutting bits 41 are maintained in position in the mounting block 39 by means of pairs of set screws 42 which bear against shim plates 43 which are positioned in the slots of the mounting block 39 in abutting relation with cutter 41. These shim plates 43 are made of a soft metal such as brass so that the set screw 42 can deform and bite into the shim plates 43.

As shown in FIG. 2, each of the cutting bits 41 is tapered such that its maximum thickness is located at the base 44 positioned at the bottom of the slot 46. Should the set screw 42 loosen, the bit will not be immediately thrown out of the rotating cutter head, but rather will merely move outwardly until any slack between the set screw 42, the shim 43 and the bit 41 has been taken up. The displacement of the bit away from the base of the slot 46 results in the affected bit 41 taking a deeper cut in the plastic pipe. This will result in vibration of the cutter head during the pipe cutting operation so that the operator will be alerted to the loosening of the set screw.

Figure 4:
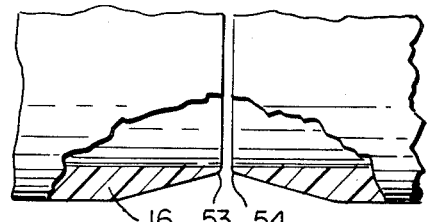
FIG. 4 is a side elevation of a pipe which has been cut by the pipe cutter of the present invention with parts broken away.

Referring next to FIG. 3, the bit 41 includes two cutting edges 47, 48 which form the bevel on the ends of the two sections of the pipe 16 which are cut apart. These two cutting surfaces 47, 48 form an obtuse angle and are separated by a narrow protruding section 49 which is designed to cut a slot entirely through the wall of the pipe. The inclined edges 47, 48 and the narrow slotting section 49 of the bit 41 are joined by two rounded shoulders 51, 52 which, as shown in FIG. 4 produce rounded edges 53, 54 on the pipe 16 as it is cut. These rounded shoulders 53, 54 facilitate insertion of the pipe into a seal mounted in the enlarged end of a pipe or fitting. A bevel of a given width is formed on the pipe which has a more gentle incline than is achieved if the pipe were beveled over the same width to a sharp edge. The shallow beveled angle resulting from use of the present pipe cutting device greatly facilitates insertion of the pipe into the elastomeric seal.

Referring next to FIGS. 2 and 3, the uniform cutting depth and the consistency of the cut and bevel formed in pipe by the present cutting device is maintained by means of a guard 46 the lower edges of which 57 serve as a depth guage. This guard 56 forms a housing which covers the cutter head with only a portion of the tapered cutting bits 41 extending beneath the guard during operation of the pipe cutting device 11. The lower edges 57 of the guard 46 each include a convex section 58 bouned by two concave sections 59, 61. The convex section is generally rounded, the center of curvature of this convex section 58 being located approximately at the rotational axis of the cutter head 38. As such, the distance that the bits 41 protrude from the guard 56 is uniform as the sweep along the convex section 58. The guard and cutting assembly 13 may thus be moved laterally and tilted about the axis of rotation of the cutter head 38 and will continue to cut a bevel of uniform width and depth so long as the convex sections 58 of both sides of the lower surface of the guard 56 remain in contact with the pipe.

The concave sections 59, 61 on either side of the convex section 58 are formed such that the guard 56 remains in contact with the pipe. Should the guard and cutting assembly 13 be pivotted excessively about the axis of rotation of the cutter head 38 or should it be displaced laterally by too great a distance, one or the other of these sections comes in contact with the pipe 16. Because of their concave configuration, these sections conform generally to the surface of the pipe 16 and act as stops to prevent the pipe 16 from slipping out of engagenent with the guard 56.

Since the wall thickness of the various types of plastic pipe may vary, it may be necessary to adjust the depth of cut made by the rotating cutting bits. This can be accomplished by mounting the guard 56 to the arm 21 by means of a mounting tab 62 which pivots about a mounting bolt 63. The inner side wall 64 of the guard 56 is maintained in contact with a mounting plate 66, which is bolted to the arm 21 by means of a bolt 67 which extends through the guard 56 and through an arcuate slot 68 formed in the plate 69. A scale 69 is marked on the plate 66 adjacent the slot 68 and an indicator tab 71 is mounted to the guard 56 to provide a visual index by which the change in depth of cut can be measured.

Referring next to FIGS. 1 and 3, the outer side 72 of the guard 56 is flat and is perpendicular to the axis of rotation of the cutting head 38. In order to ensure that the pipe is cut perpendicular to its longitudinal axis, a guide collar may be positioned on the pipe 16 for the flat side 72 of the guard 56 to bear against. This guide collar assembly 14 comprises an annular guide band 73 which includes a flanged section 74 for engaging the flat side 73 of the guard 56. The band 74 is made of a flexible material and is split so that it can be fit over the pipe 16. A conventional band clamp 76 may be fit around the band 74 and tightened to maintain the band 73 in position on the pipe 16. Alternately, the guide collar assembly 14 may comprise a pair of semi-circular guide members which are hinged together such that they may be closed to form a generally circular guide.

The pipe cutting device of the present invention may be used by mounting the guide collar assembly 14 at the desired location on the pipe 14. The cutter head 38 is then caused to rotate at a rapid rate and the flat side 72 of the guard 56 is brought into contact with the guide collar assembly 14. The convex lower surfaces 58 of the guard 56 are then brought into contact with the pipe. The pipe is then cut by drawing the guard 56 across the surface of the pipe so as to maintain the convex section 58 in contact with the pipe at all times. The pipe 16 is rotated as necessary to expose its entire circumference to the cutting action of the rotating cutting bits 41.

Although the flat side 72 of the guard 56 may be maintained in contact with the flanged section 74 of the guide collar assembly 14 to cut the pipe 16 in a place perpendicular to its circumference, a reasonably true cutting of the pipe 16 may be accomplished by careful use of the pipe cutting device 11 alone.

Although the invention has been described with respect to a specific embodiment and specific uses therefore, it will be understood that modifications in the structure or usage may be made without departing from the scope of the invention.

I claim:

1. An apparatus for cutting plastic pipe comprising;
    means for engaging a pipe including rotatable cutting means for cutting said pipe to a predetermined depth,
    drive means operatively associated with said pile engaging and cutting means for rotating said cutting means,
    said rotatable cutting means including at least one cutting bit and mounting means therefor,
    said mounting means forming a slot for receiving said cutting bit with said cutting bit being tapered such that, when mounted in said slot the bit increases in thickness toward the bottom of said slot,
    deformable shim means positionable in said slot, and
    locking means for deformably engaging said shim means and pressing said shim means into engagement with said bit when said bit is mounted in said slot, whereby said bit is retained in said slot during rotation of said rotatable cutting means.

2. An apparatus for cutting plastic pipe comprising;
    rotatable cutting means for simultaneously cutting a plastic pipe into two sections and beveling the cut edges of said two sections,
    means forming a housing mounted adjacent said rotatable cutting means,
    said housing means including at least one pipe engaging surface including an elongated pipe engaging section for engaging a pipe and controlling the depth of cutting and beveling of a pipe by said cutting means when said pipe is engaged at any point along said pipe engaging means,
    said rotatable cutting means including at least one cutting bit and mounting means therefor, said mounting means forming a slot for receiving said cutting bit and said cutting bit being tapered such that, when mounted in said slot, the bit increases in thickness toward the bottom of said slot,
    deformable shim means positionable in said slot, and
    locking means for deformably engaging said shim mans and pressing said shim means into engagement with said bit when said bit is mounted in said slot, whereby said bit is retained in said slot during rotation of said rotatable cutting means.

3. An appratus for cutting and beveling pipe or a similar hollow work piece comprising;
- a mounting block slotted to receive at least one cutting bit,
- means for mounting said block on a rotatable shaft,
- a cutting bit mountable in the slot of said mounting block, said bit including two oppositely inclined cutting edges separated by a protruding central cutting section whereby the wall of said hollow work piece may be severed and the end portions of each severed piece simultaneously beveled,
- means forming a housing for receiving said mounting block and forming an aperture through which said bit is extendable, said housing including two work piece engaging surface positioned on opposite sides of said mounting block,
- said work piece engaging surfaces each including a convex section for engaging a work piece and limiting the depth of cut made in said work piece when said mounting block and bit are rotated within said housing,
- at least one concave work piece engaging section on said work piece engaging surfaces adjacent one of said convex sections for receiving said work piece and retaining it in contact with said housing means, and
- means for adjustable positoning said housing relative to said mounting block for adjustably controlling the depth of cut of said cutting bit.

4. An apparatus for cutting plastic pipe comprising;
- a mounting block slotted to receive at least one pipe cutting bit,
- means for mounting said block on a rotatable shaft,
- a pipe cutting bit mountable in the slot of said mounting block, said bit including two oppositely inclined cutting edges separated by a protruding central cutting section,
- means forming a housing for receiving said mounting block and forming an aperture through whcih said bit is extendable, said housing including two pipe engaging surfaces positioned on opposite sides of said mounting block, said surfaces including a convex section for engaging a pipe and controlling the depth of cut made in said pipe when said mounting block and bit are rotated within said housing and further including at least one concave pipe engaging section for receiving said pipe and retaining it in contact with said housing means;
- means for adjustably positioning said mounting block relative to the housing,
- deformable shim means mountable in said slot in abutting relation with said bit, and
- locking means for deformably engaging said shim means and pressing it into engagement with said bit when said bit is mounted in said slot, said bit being tapered such that, when it is mounted in said slot, its thickness increases toward the bottom of the slot.

5. In a rotatable cutting appratus having a cutting bit mounting block and means for rotating said block, cutting bit mounting means for mounting a cutting bit in said block comprising;
- means forming at least one slot in the surface of said block,
- said cutting bit being tapered and having the increased dimensioned end thereof located in the bottom portion of said slot,
- deformable shim means positionable in said slot adjacent said bit, and
- locking means operatively associated with said block for deformably pressing said shim against said bit.

6. The cutting apparatus according to claim 5 wherein said cutting bit comprises an elongated body for simultaneously severing a pipe or similar hollow work piece and beveling the severed ends thereof,
- said body having a central protrusion adapted for cutting through the work piece wall and oppositely directed upwardly inclined elongated cutting edge extending away from the base of said protrusion for forming beveled edges on the severed ends of the work piece.

7. The cutting apparatus according to claim 6 including a radius between the base of said protrusion and each of said cutting edges for forming blunt edges on said severed ends of the work piece.

8. In a cutting assembly for pipe or similar hollow work piece cutting device including a rotatable cutting bit mounting block, means for mounting said block for rotation about an axis thereof and cutting bit means carried by said block for cutting a work piece, a depth gauge guard housing comprising;
- a housing body including at least one side wall adjacent the end of said block and extending to a position adjacent the cutting bit means,
- said one side wall including a depth gauge surface for contacting said work piece to control the depth of cut of said bit means,
- said depth gauge surface comprising a convex central portion having a curvature generally conforming to the circular path of said mounting block and at least one concave end portion adjacent said convex portion and generally conforming to the configuration of said work piece, and
- means to lock said housing body in fixed position relative to said cutting bit means to control the depth of cut thereof,
- said concave end portion preventing said cutting bit means from sliding off the work piece in at least one direction during cutting action.

9. The cutting assembly according to claim 8 wherein,
- said housing body includes parallel side walls located in planes at right angles to said axis of rotation at opposite ends of said block and extending to a position adjacent to said cutting bit means, each of said side walls including said depth gauge surface.

10. The cutting assembly according to claim 9 wherein said depth gauge surface includes a second concave end portion on the other side of said convex portion, whereby said cutting bit is prevented from sliding off the work piece in either direction during cutting action.

11. The cutting assembly according to claim 10 wherein said cutting bit mounting block includes means for mounting a cutting bit in said block comprising;
- means forming at least one slot in the surface of said block,
- said cutting bit being tapered and having the increased dimensioned end thereof located in the bottom portion of said slot,
- shim means positionable in said slot adjacent said bit, and
- locking means operatively associated with said block for pressing said shim against said bit.

12. The cutting assembly according to claim 11 wherein said cutting bit comprises an elongated body for simultaneously severing a pipe or similar hollow work piece and beveling the severed ends thereof, said body having a central protrusion adapted for cutting through the work piece wall and oppositely directed upwardly inclined elongated cutting edges extending away from the base of said protrusion for forming beveled edges on the severed ends of the work piece.

13. The cutting assembly according to claim 8 wherein said means for mounting said block for rotation includes;
- an elongated support arm operatively associated with said mounting block, and
- drive means mounted to said arm and drivingly connected to rotate said block.

14. The cutting assembly according to claim 13 wherein;
- said support arm and said drive means are constructed and arranged to be hand held by an operator with the depth gauge guard housing in contact with the surface of the workpiece.

* * * * *

UNITED STATES PATENT AND TRADEMARK OFFICE
CERTIFICATE OF CORRECTION

PATENT NO. : 4,689,883
DATED : September 1, 1987
INVENTOR(S) : Larry G. Dent

It is certified that error appears in the above-identified patent and that said Letters Patent are hereby corrected as shown below:

Claim 1, line 5, change "pile" to --pipe--
Claim 2, line 21, change "mans" to --means--
Claim 3, line 15, change "surface" to --surfaces--
Claim 3, line 27, change "adjustable" to --adjustably--
Claim 6, line 7, change "edge" to --edges--

Signed and Sealed this

Sixteenth Day of February, 1988

Attest:

DONALD J. QUIGG

Attesting Officer

Commissioner of Patents and Trademarks